3,299,709
RESISTANCE THERMOMETER SYSTEM
George A. O'Sullivan, New Fairfield, Conn., assignor to Consolidated Controls Corporation, Bethel, Conn., a corporation of New Mexico
Filed Aug. 27, 1963, Ser. No. 304,868
11 Claims. (Cl. 73—362)

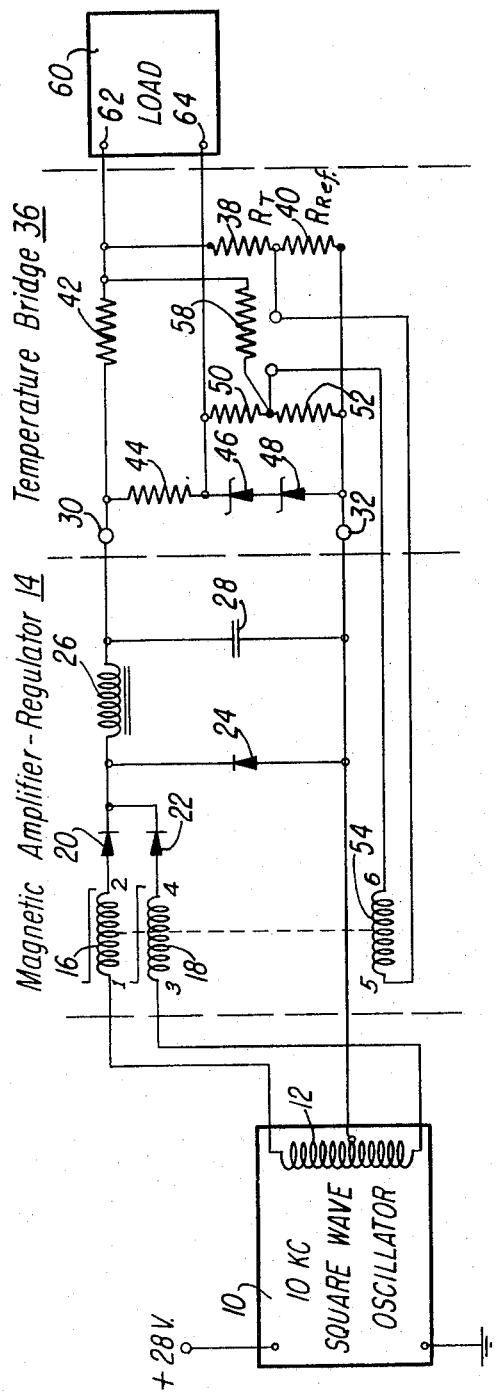

The present invention relates to resistance thermometer systems, and, more particularly, to resistance thermometer systems wherein variations in the resistance of a measuring element with temperature are converted to an electrical output signal which may be transmitted over long distances to a readout area.

In the resistance thermometry art many arrangements have heretofore been proposed for producing electrical output signals indicative of the temperature to be measured. In my copending application S.N. 778,990, filed December 8, 1958, now Patent 3,163,042, issued December 29, 1964, a system is disclosed which comprises a resistance measuring element of platinum wire, for example, which is connected in series with a reference resistor having a zero temperature coefficient of resistivity, the reference resistor having the same resistance value as the platinum measuring element at one particular temperature. A voltage regulation system is employed to provide a substantially constant current flow through the series connected reference resistor and platinum resistance measuring element. This is accomplished by providing a stabilized reference voltage which is compared with the voltage produced across the zero temperature coefficient resistor and the resultant error signal is employed to hold the current flow through the reference resistor constant. Since the resistance of the platinum resistance measuring element varies with temperature, the voltage produced across the series combination of this resistance and the zero temperature coefficient reference resistor will vary substantially linearly with temperature and is not dependent upon the initial resistance of the platinum resistance element. Accordingly, the output signal of such a system is dependent only on the temperature coefficient of resistivity of the resistance element which is employed. With such a system different reference resistor and temperature measuring resistor combinations can be substituted in the system and the electrical output signal will remain in calibration since the current regulation system will function to provide a new value of constant current through the reference resistor which is sufficient to exactly match the fixed reference voltage of the system.

The present invention is directed to a temperature regulation system of the same general type as described and claimed in my above identified copending application. However, in accordance with the present invention an extremely low output impedance circuit is provided for the electrical output signal which varies with temperature. This low output impedance load circuit permits the transmission of the electrical output signal over substantial distances to remote readout locations without in any way affecting the accuracy of the temperature measuring system. Furthermore, the output impedance of the load circuit may be varied, as when additional readout units are connected in parallel, without changing the accuracy or calibration of the temperature measuring system.

It is, therefore, an object of the present invention to provide a new and improved resistance thermometer system wherein a low impedance output circuit is provided for an electrical output signal.

It is another object of the present invention to provide a new and improved resistance thermometer system in which a zero temperature coefficient reference resistor is connected in series with the resistance measuring element and the current through this reference resistor is held substantially constant by comparison with a fixed reference voltage, while, at the same time, providing a low impedance output circuit for measurement of the voltage across the series combination of the resistance measuring element and reference resistor.

It is another object of the present invention to provide a new and improved resistance thermometer system wherein the current through a reference resistor of zero temperature coefficient is held substantially constant while, at the same time, providing an output load circuit which may vary in impedance without affecting the accuracy of the electrical output signal of the system.

Briefly, in accordance with one aspect of the invention, the electrical output signal is derived by comparing the voltage produced across the series combination of the resistance measuring element and the zero temperature coefficient reference resistor with a fixed reference voltage, which may be produced by any suitable means such as a Zener diode system, or the like. By connecting the load circuit between this series combination of resistors and the reference voltage source, the load current flows through the reference voltage source and not through the series combination of measuring and reference resistors. As a result, the loading effect of the load circuit upon the measuring elements is substantially eliminated. Furthermore, since the load current flows through the reference voltage source, a compensating effect is produced as the load current increases which tends to provide an extremely low output impedance for the resistance thermometer system. The circuit constants may be adjusted so that an output impedance of only 5 to 10 ohms is provided and with this low output impedance circuit the electrical output signal may be transmitted over long distances to remote readout points or, in the alternative, a large number of readout devices may be connected in circuit with the resistance thermometer system without affecting the accuracy thereof.

The invention, both as to its organization and manner of operation, together with further objects and advantages, may best be understood by reference to the following detailed description taken in conjunction with the accompanying drawing in which the single figure of the drawing is a circuit diagram of a resistance thermometer system embodying the features of the present invention.

Referring now to the single figure of the drawing, the present invention is therein illustrated as comprising a square wave oscillator 10 which is arranged to produce a push-pull square wave output signal at the secondary 12 of the output transformer of the oscillator 10. Preferably the oscillator 10 is arranged to be energized from a 28 volt D.C. source so that the overall resistance thermometer system may be energized by low voltage direct current which is required for some installations. Also, the oscillator 10 may comprise a suitable magnetic coupled oscillator, for example, the so-called Royer oscillator, in which transistors and a square loop core arrangement are employed to provide a ten kilocycle output square wave. An oscillator of this type provides good isolation between the input and output circuits of the oscillator.

The square wave produced in the output winding 12 is supplied to a magnetic amplifier-regulator indicated generally at 14 which is provided with a pair of main windings 16 and 18, the winding 16 being connected from the upper end of the winding 12 to a rectifier 20 and the winding 18 being connected to a rectifier 22. The cathodes of the rectifiers 20 and 22 are connected together and the magnetic amplifier output signal is supplied to a filter network which includes the shunt connected diode 24, the inductance 26 and a filter capacitor 28. The magnetic amplifier supplies square wave pulses to the input of the filter 24, 26 and 28 and this filter removes any A.C. ripple from the magnetic amplifier output.

When the magnetic amplifier is unsaturated or non-conducting, current flows through the rectifier 24, the inductance 26 and the load circuit connected to the output terminals 30, 32 of the magnetic amplifier 14. This load circuit comprises a temperature bridge indicated generally at 36 which includes a resistance measuring element 38, connected in series with a reference resistor 40 having a zero temperature coefficient of resistivity. The resistor 38, also identified as the resistor $R_T$, preferably comprises a resistance material having a known and repeatable curve of resistance vs. temperature, such, for example, as platinum, molybdenum, copper or tungsten, this element usually being in the form of a resistance wire wound or otherwise supported on a suitable form. The zero temperature coefficient reference resistor 40 is made of a material such as manganin or constantin having a substantially zero temperature coefficient of resistivity. In a particular application the resistor 38 had a resistance which varied from a resistance of 451 ohms at −65° F. to a resistance of 851 ohms at 275° F. The reference resistor 40 had a resistance of 475 ohms which is maintained substantially constant throughout the temperature range of the resistor 38.

In order to maintain a constant current through the reference resistor 40, the positive terminal 30 of the magnetic amplifier 14 is connected through a zero temperature coefficient resistor 42 to the upper end of the resistor 38 and the bottom end of the resistor 40 is connected to the negative terminal 32 of the amplifier 14. In the above application the resistor 42 had a value of 400 ohms. A stabilized reference voltage is provided by means of a resistor 44 and a pair of Zener diodes 46 and 48, which are connected in series across the output terminals 30, 32 of the amplifier 14. A pair of zero temperature coefficient resistors 50 and 52, which in the above referred to application had a resistance of 1900 ohms each, are connected across the Zener diodes 46, 48, these diodes providing a stabilized reference voltage of about 12 volts. There is thus produced across the resistor 52 a stabilized reference voltage against which the voltage produced across the reference resistor 40 may be compared to maintain the current through the resistor 40 constant. To this end, a control winding 54 of the magnetic amplifier 14 is connected between the junction of the resistors 50, 52 and the junction of the resistors 38, 40. With this arrangement, any variation in current through the reference resistor 40, which may be due to an undesired fluctuation in the power supply, or any other circuit variable, will immediately produce an error signal which is applied to the input of the magnetic amplifier 14 in such manner as to cause the voltage produced across the output terminals 30, 32 to vary in the direction to reduce this error signal. Also, if a difference combination of resistors 38, 40 is substituted the amplifier-regulator 14 will function to adjust the current through the reference resistor of the new combination so that the voltage produced across the new resistor is equal to the fixed reference voltage across the resistor 52.

While the temperature coefficient of resistivity of the resistance measuring element 38 is sufficiently constant for many applications, this temperature coefficient does vary considerably when measurement is made over a wide temperature range. In such situations, it is desirable to improve the linearity of response of the temperature measuring system so that the electrical output signal of the system varies exactly linearly with temperature. Correction for non-linearity of the temperature coefficient of the resistance element 38 is provided by connecting a resistor 58 from the junction of the resistors 42 and 38 to the junction of the resistors 50 and 52. The load circuit 60 of the resistance thermometer system is connected from the junction of the resistors 42 and 38 to the upper end of the resistor 50 and the circuit is arranged to supply an output signal to the load 60 which varies from zero to 5 volts over the measurement range of the resistor 38. With the circuit constants indicated the output of the amplifier-regulator 14 will vary from 16 to 21 volts.

Considering now the operation of the resistance thermometer system of the present invention, as the temperature increases the resistance of the measuring element 38 will also increase, since this element has a substantial positive temperature coefficient of resistivity. When the resistance of the element 38 increases the current through the series combination of the resistors 42, 38 and 40, which are connected across the output terminals 30, 32 of the amplifier 14, tends to decrease. However, when the voltage across the reference resistor 40 tends to decrease a control signal is supplied to the control winding 54 of the amplifier 14 in such direction as to increase the voltage appearing across the terminals 30, 32, since the voltage across the resistor 52 remains constant due to the Zener diode regulation circuit. The voltage at the terminals 30, 32 is increased by an amount such that the current through the reference resistor 40 is returned to its initial value. The voltage across the series combination of the resistors 38 and 40 thus varies in accordance with changes in temperature, and, as described in detail in my above identified copending application, this variation in voltage is dependent only upon the temperature coefficient of resistivity of the measuring resistor 38. Since the load circuit 60 is connected between the fixed voltage provided by the Zener diodes 46, 48 and the series combination of the resistors 38, 40, it will be evident that a voltage will be produced across the terminals 62, 64 of the load circuit 60 which is also proportional to temperature and is dependent only upon the temperature coefficient of resistivity of the element 38. Moreover, the current which flows through the load circuit 60 is returned to the Zener diode circuit and hence this load current does not flow through the series combination of the resistance measuring element 38 and the zero temperature coefficient reference resistor 40. Since the magnetic amplifier 14 tends to keep the current in the reference resistor 40 constant, the voltage drop across elements 38, 40 will be independent of the amount of current which is drawn by the load circuit 60 and hence the temperature measuring circuit 38, 40 is substantially independent of the load impedance of the load circuit 60. In addition, the connection of the load current to the Zener diode circuit provides a compensating effect which tends to vary the output voltage in such manner as to compensate for changes in current drawn through the load 60. More particularly, if it is assumed that the current drawn by the load circuit 60 increases, the voltage available for the elements 38, 40 will be reduced due to the increased voltage drop through the resistor 42. However, the increased load current flowing through the resistors 50, 52 which are connected across the Zener diodes 46, 48, will provide a slight increase in the fixed reference voltage so that the current through the resistor 40 is now compared to a slightly higher reference voltage. This will, in turn, cause an increase in the output voltage of the magnetic amplifier 14 at the terminals 30, 32 and will offset the decrease in voltage supplied to the combination 38, 40 due to the increased load current. By proper design of circuit constants the output load impedance at the terminals 62, 64 may be made very small, in the order of 5 or 10 ohms. This means that the electrical output signal of the resistance thermometer system may be supplied over large distances to remote readout devices without loading down the temperature bridge 36 or affecting the accuracy thereof. Also, a large number of readout circuits may be connected across the output terminals 62, 64 without affecting the accuracy of the temperature bridge 36. Such low output impedance also aids in the suppression of noise voltages which may be produced on the transmission lines connected to the terminals 62, 64 for transmission to remote locations as well as the rejection of signals induced on these lines due extraneous voltage pickup and the like.

The connection of the resistor 58 to the junction of the resistors 42 and 48 provides a component of current through the resistor 52 which is proportional to temperature, i.e., the voltage produced across the series combination of the resistor elements 38 and 40. This component of current can be adjusted by choosing the correct value of resistor 58 so that non-linearity in the temperature coefficient of the element 38 is compensated and a truly linear output signal is supplied to the load terminals 62, 64. In this connection it is noted that the reference voltage developed by the Zener diodes 46, 48 is not exactly constant and varies from 12 volts to 12.4 volts, when the output voltage at the terminals 30, 32 varies from 16 volts to 21 volts, i.e., the normal range of the output signal of the system. However, since this variation in the reference voltage provided by the Zener diodes is in the same direction as the component of current contributed by the non-linearity resistor 58, the Zener diode variation may be compensated by utilizing a slightly smaller component of current for non-linearity correction. Thus, the non-linearity component is chosen to be smaller than necessary to correct for the 0.7% non-linearity of the platinum resistance element 38 by an amount such that the increase in reference voltage as the output voltage at the terminals 30, 32 increases with temperature will provide the additional correction required to linearize the output signal completely.

While the Zener diode reference circuit has been shown as connected across the output terminals 30, 32 of the magnetic amplifier 14, it will be understood that this reference signal circuit may be energized by any suitable voltage source. It will also be noted that only the single control winding 54 is required to compare the voltage produced across the reference resistor 40 with the voltage produced across the resistor 52. Thus, only one winding is required to provide voltage comparison for control of the magnetic amplifier 14 and also for non-linear correction for the temperature coefficient of the element 38.

While the amplifier-regulator 14 has been shown as a magnetic amplifier, it will be understood that other types of amplifiers employing, for example, transistors or vacuum tubes, may be substituted for such a magnetic amplifier. It is only necessary that the amplifier 14 be arranged to produce the desired output voltage at the terminals 30, 32 and is responsive to the error voltage produced between the junction of the resistors 50, 52 and the junction of the resistors 38, 40 to control the output voltage in such manner as to minimize this error voltage.

While a particular embodiment of the invention has been illustrated and described, it will be understood that many changes and modifications will readily occur to those skilled in this art and it is, therefore, contemplated by the appended claims to cover any such changes and modifications as fall within the true spirit and scope of the invention.

What is claimed as new and desired to be secured by Letters Patent of the United States is:

1. A resistance thermometer system comprising a first resistance element having a resistivity which varies with temperature over a predetermined range, a second resistance element having the same resistance as said first element at a predetermined temperature and having a substantially zero temperature coefficient of resistivity, a variable voltage source, means connected across said source for establishing a highly regulated reference voltage, means connecting said resistance elements in series across said source, means jointly controlled by said reference voltage and current flow through said second element for controlling said voltage source to maintain the current through said second element substantially constant, a load circuit, and means for supplying a voltage to said load circuit proportional to the voltage differential between the voltage produced across said first and second elements in series and said reference voltage.

2. A resistance thermometer system comprising a first resistance element having a resistivity which varies with temperature over a predetermined range, a second resistance element having the same resistance as said first element at a predetermined temperature and having a substantially zero temperature coefficient of resistivity, a variable voltage source, means connected across said source for establishing a highly regulated reference voltage, means connecting said resistance elements in series across said source, means jointly controlled by said reference voltage and current flow through said second element for controlling said voltage source to maintain the current through said second element substantially constant, a load circuit, and means connecting said load circuit in circuit with said reference voltage, thereby to reduce the loading effect of said load circuit upon said first and second elements.

3. A resistance thermometer system comprising a first resistance element having a resistivity which varies with temperature over a predetermined range, a second resistance element having the same resistance as said first element at a predetermined temperature and having a substantially zero temperature coefficient of resistivity, a variable voltage source, means connected across said source for establishing a highly regulated reference voltage source, means connecting said resistance elements in series across said variable voltage source, means jointly controlled by said reference voltage and current flow through said second element for controlling said variable voltage source to maintain the current through said second element substantially constant, a load circuit, means connecting one terminal of said load circuit to said first resistance element, and means connecting the other terminal of said load circuit to said reference voltage source.

4. A resistance thermometer system comprising a first resistance element having a resistivity which varies with temperature over a predetermined range, a second resistance element having the same resistance as said first element at a predetermined temperature and having a substantially zero temperature coefficient of resistivity, a variable voltage source, first resistor, Zener diode voltage regulating means, means connecting said first resistor in series with said Zener diode means across said voltage source, means connecting said first and second resistance elements in series across said voltage source, means jointly controlled by the voltage developed by said Zener diode means and current flow through said second element for controlling said voltage source to hold the current through said second element substantially constant, a load circuit, and means for supplying a voltage to said load circuit proportional to the voltage differential between the voltage produced across said first and second elements in series and the voltage developed by said Zener diode means.

5. A resistance thermometer system comprising a first resistance element having a resistivity which varies with temperature over a predetermined range, a second resistance element having the same resistance as said first element at a predetermined temperature and having a substantially zero temperature coefficient of resistivity, a variable voltage source, a first resistor, Zener diode voltage regulating means, means connecting said first resistor in series with said Zener diode means across said voltage source, means connecting said first and second resistance elements in series across said voltage source, means jointly controlled by the voltage developed by said Zener diode means and current flow through said second element for controlling said voltage source to hold the current through said second element substantially constant, a load circuit, and means connecting said load circuit in series with said Zener diode means and said variable voltage source, thereby to reduce the loading effect of said load circuit upon said first and second resistance elements.

6. A resistance thermometer system comprising a first resistance element having a resistivity which varies with temperature over a predetermined range, a second resistance element having the same resistance as said first element at a predetermined temperature and having a substantially zero temperature coefficient of resistivity, a variable voltage source, a fixed voltage source, means connecting said first and second resistance elements in series across said variable voltage source, means jointly controlled by said fixed voltage source and current flow through said second element for controlling said variable voltage source to maintain the current through said second element substantially constant, a load circuit, and means connecting said load circuit between said fixed voltage source and the series combination of said first and second elements.

7. A resistance thermometer system comprising a first resistance element having a resistivity which varies with temperature over a predetermined range, a second resistance element having the same resistance as said first element at a predetermined temperature and having a substantially zero temperature coefficient of resistivity, a variable voltage source, a fixed voltage source, means connecting said first and second resistance elements in series across said variable voltage source, third and fourth resistance elements connected across said fixed voltage source and each having a substantially zero temperature coefficient of resistivity, means connected from the junction of said first and second elements to the junction of said third and fourth elements for controlling said variable voltage source to maintain the current through said second element substantially constant, a load circuit, and means connecting said load circuit between said first and third resistance elements.

8. A resistance thermometer system comprising a first resistance element having a resistivity which varies with temperature over a predetermined range, a second resistance element having the same resistance as said first element at a predetermined temperature and having a substantially zero temperature coefficient of resistivity, a variable voltage source, a fixed voltage source, means connecting said first and second resistance elements in series across said variable voltage source, third and fourth resistance elements connected across said fixed voltage source and each having a substantially zero temperature coefficient of resistivity, means for comparing the voltage produced across said second and fourth resistance elements and for employing any difference therebetween to control said variable voltage source to maintaitn the current through said second element substantially constant, means for supplying a current to said fourth resistance element proportional to the voltage developed across the series combination of said first and second elements, a load circuit, and means connecting said load circuit between said first and third resistance elements.

9. A resistance thermometer system comprising a first resistance element having a resistivity which varies with temperature over a predetermined range, a second resistance element having the same resistance as said first element at a predetermined temperature and having a substantially zero temperature coefficient of resistivity, an amplifier having a control circuit and an output circuit, means connecting said first and second elements in series in the output circuit of said amplifier, a stabilized voltage source, third and fourth resistance elements connected across said stabilized voltage source and each having a substantially zero temperature coefficient of resistivity, means connecting the voltages produced across said second and fourth resistance elements to the control circuit of said amplifier to control the output thereof in such manner as to hold the current through said second element substantially constant, and a work circuit connected between a point of fixed potential of said stabilized voltage source and said first resistance element.

10. A resistance thermometer system comprising a first resistance element having a resistivity which varies with temperature over a predetermined range, a second resistance element having the same resistance as said first element at a predetermined temperature and having a substantially zero temperature coefficient of resistivity, an amplifier having a control circuit and an output circuit, means connecting said first and second elements in series in the output circuit of said amplifier, stabilized voltage source means, third and fourth resistance elements connected across said stabilized voltage source means and each having a substantially zero temperature coefficient of resistivity, means for comparing the voltages produced across said second and fourth resistance elements and for applying any difference therebetween to the control circuit of said amplifier in the correct direction to minimize said difference, means for supplying a current to said fourth element proportional to the voltage developed across the series combination of said first and second elements, and a work circuit connected between a point of fixed potential connected to said stabilized voltage means and said first resistance element.

11. A resistance thermometer system comprising a first resistance element having a resistivity which varies with temperature over a predetermined range, a second resistance element having the same resistance as said first element at a predetermined temperature and having a substantially zero temperature coefficient of resistivity, a variable voltage source, a first resistor, Zener diode voltage regulating means, means connecting said first resistor in series with said Zener diode means across said voltage source, means connecting said first and second resistance elements in series across said voltage source, means jointly controlled by the voltage developed by said Zener diode means and current flow through said second element for controlling said voltage source to hold the current through said second element substantially constant, a load circuit, and means connecting said load circuit in series with said Zener diode means, the series combination of said load circuit and said Zener diode means being connected across said first and second resistance element, thereby to reduce the loading effect of said load circuit upon said first and second resistance elements.

References Cited by the Examiner

UNITED STATES PATENTS 3,163,042   12/1964   O'Sullivan _____ 73—362

LOUIS R. PRINCE, *Primary Examiner.*

S. BAZERMAN, *Assistant Examiner.*